(Model.) 2 Sheets—Sheet 1.

H. MOELLER.
MACHINE FOR MAKING HORSESHOE NAIL BLANKS.

No. 246,802. Patented Sept. 6, 1881.

Witnesses:
Carl Karp
Otto Rusch

Inventor:
Hugo Moeller
by
Paul Goepel
Attorney.

(Model.) 2 Sheets—Sheet 2.
H. MOELLER.
MACHINE FOR MAKING HORSESHOE NAIL BLANKS.
No. 246,802. Patented Sept. 6, 1881.
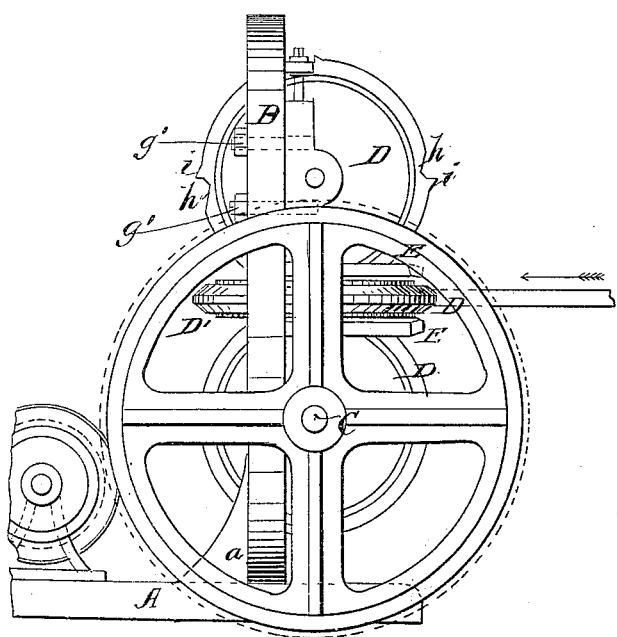
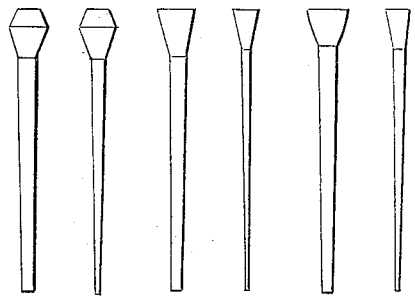
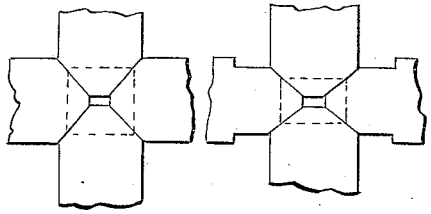
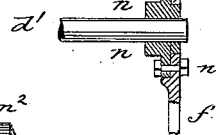
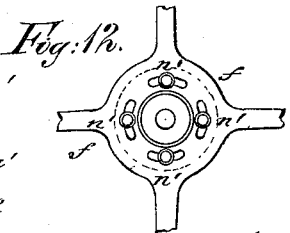
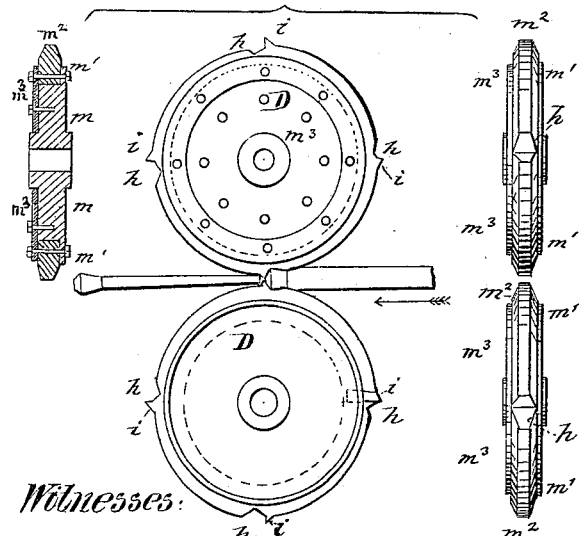
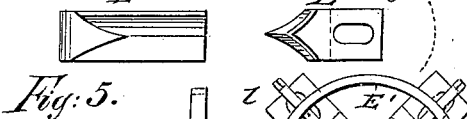
Witnesses:
Carl Knapp
Otto Risch
Inventor:
Hugo Moeller
by Paul Goepel
Attorney.

UNITED STATES PATENT OFFICE.

HUGO MOELLER, OF BERLIN, PRUSSIA, GERMANY.

MACHINE FOR MAKING HORSESHOE-NAIL BLANKS.

SPECIFICATION forming part of Letters Patent No. 246,802, dated September 6, 1881.

Application filed March 5, 1880. (Model,)

*To all whom it may concern:*

Be it known that I, HUGO MOELLER, of the city of Berlin, in the Kingdom of Prussia, German Empire, have invented Improvements in Machines for Making Horseshoe-Nail Blanks, of which the following is a specification.

Figure 1:
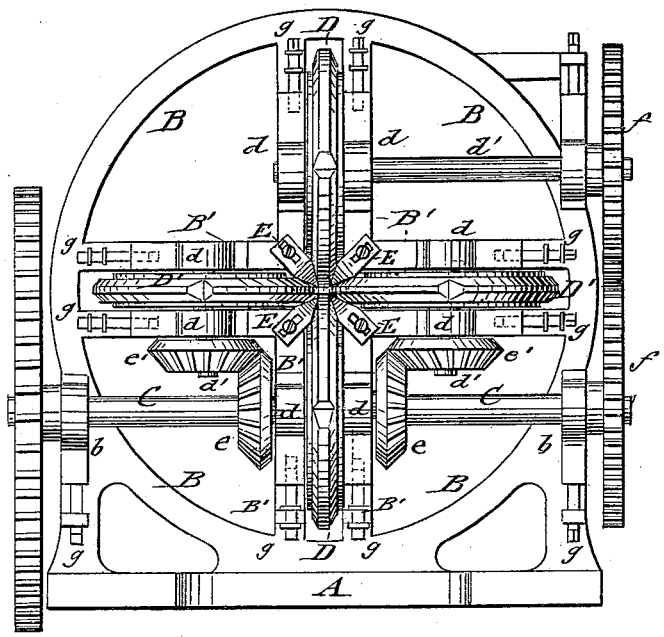
Figure 2:
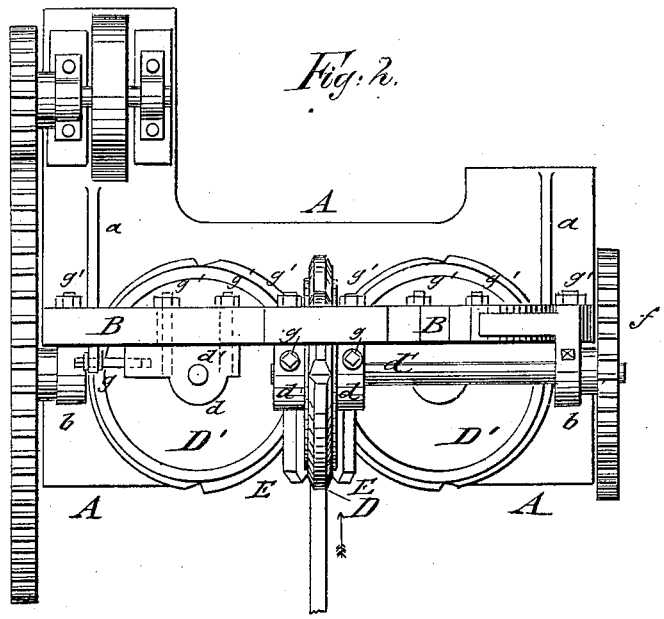

In the accompanying drawings, Figure 1 represents a front elevation of my improved machine for rolling horseshoe and other nail blanks; Fig. 2, a plan view, and Fig. 3 a side elevation, of the same. Fig. 4 represents detail side and end views of a pair of beveled rolls and a central section of one roll. Figs. 5 and 6 represent detail views of the tapering guard-fingers and their supporting-ring. Figs. 7 and 8 are detail sections of two pairs of the beveled rolls, shown as arranged for different degrees of taper at the shanks, a part of the rolls only being shown, the remainder being broken away. Figs. 9, 10, and 11 are front and side views of nail-blanks of equal length and size, but with differently-shaped heads; and Fig. 12 shows the connection of some of the transmitting gear-wheels of the machine with their shafts.

Similar letters of reference indicate corresponding parts.

This invention has for its object to produce a machine by which rolled nail-blanks or partly-finished nails with heads, but without finished or beveled points, are made by a continuous method directly from the iron rod and without any loss of stock.

This is accomplished by two pairs of circumferentially-beveled rolls, of which one pair is placed at right angles to the other, while all are rotated uniformly and in such directions as will produce the desired result. The rolls are divided at the circumference into as many eccentric portions as there are nail-blanks to be produced at each revolution of the rolls. The eccentric portions produce the gradual diminution of the rectangular opening left between the adjoining faces of the four rolls, and impart a decreasing taper to the nail-shank. The heads of the nail-blanks are formed by means of notches arranged at the circumference of the rolls at the end of each eccentric portion. One pair of rolls is provided at one end of the notches with cutting-knives, by which the nail-blank is cut off as soon as the head is formed. Simultaneously therewith begins the formation of the next nail-blank, so that there is no loss of stock. The rolls are constructed with ring-shaped interchangeable rims, so that nail-blanks of any length, cross-section, and shape of head may be produced. The iron rod is guided by means of tapering guard-fingers, whose sharp points enter between the rolls. The guard-fingers are adjusted by means of a supporting-ring and set-screws.

The nature of my invention consists, essentially, in the employment of the tapered guard-fingers adjustably applied at the bite of the rolls, and so arranged that they will guide the nail-rod between the rolls, and also prevent the pressing out of the nail-rod metal during the operation of forming the nail-blanks continuously from the rod.

Referring to the drawings, A represents the base-plate, and B an upright frame of ring shape, which is supported by strong brackets $a\ a$ on the base-plate. The main shaft C is supported in bearings $b\ b$ of the ring-shaped frame B, the shaft receiving power from a driving-shaft by transmitting gear-wheels at one end thereof. From the ring-shaped frame B spring inwardly four angular frames, B', the arms of one frame being parallel to the arms of the next adjoining frame, and the frames forming between the arms an open space in the shape of a cross.

To the arms of the angular frames are adjustably secured the journal-bearings $d\ d$ of the shafts $d'\ d'$ and C of two pairs of rolls, D D', which rolls are arranged in the cross-shaped space between the parallel arms of the angular frame B', one pair being placed at right angles to the other. The lower roll, D, of the vertical pair of rolls is keyed centrally to the main shaft C, from which motion is transmitted by bevel-wheels $e$, arranged equidistantly and symmetrically to the lower roll, D, to similar bevel-wheels, $e'$, on the shorter shafts of the horizontal rolls D' D'. The upper roll, D, receives motion by a transmitting-gear, $f\ f$, at the opposite end of the main shaft, and by an auxiliary shaft, $d'$, which turns in the upper bearings, $d\ d$, of the frame. All the bearings $b\ b$ and $d\ d$ of the shafts of the four rolls are capable of adjustment on the angular frames by means of set-screws $g$ $g$, being then rigidly secured to the frame B by transverse binding-screws $g'$ $g'$. (Shown in Figs. 2 and 3.) The adjustment of the shaping-rolls is necessary, so that the beveled contact-rims can be set closely to each other, as shown in Figs. 7 and 8. The extent of adjustment is, however, not considerable enough to interfere with the proper meshing of the transmitting gear-wheels. The motion of all the four rolls is such that they will take up the heated rod and feed the same automatically through the machine.

Between the faces of the rolls is formed a small rectangular space, in which the shank of the nail-blank is formed. As the shank of the nail-blank is, however, slightly tapered from the head toward the point, and as the shaping of the nail-blank by the rolls is commenced at the head, it is necessary that the circumference be slightly eccentric. There have to be as many notches as nail-blanks are to be produced at each revolution of the rolls, the notches $h$ $h$ corresponding exactly to the shape of the nail-heads and being arranged equidistantly from each other. The portions of the circumference of the rolls between the notches are made with such a degree of eccentricity as is required to produce the gradually-diminishing cross-section of the nail-shank. The periphery of the eccentric portion formed between the notches ascends from the lowest point near the notch to the highest point near the opposite edge of the next adjoining notch, which eccentric portion is repeated as often as there are notches.

For simplicity's sake the shaping-rolls are shown in the drawings with four notches only, Fig. 4 showing also clearly the intermediate eccentric portions. The vertical rolls are, furthermore, provided at the highest ends of the eccentric cam-sections with cutting-knives $i$ $i$, which serve to cut off the nail-blanks from the heated rod. At the same time as one nail-blank is cut off the head of the next nail-blank is formed by the next notch, as shown clearly in Fig. 4. The side rolls require no cutting-knives, as they serve mainly for guiding and steadying the motion of the rod.

As the beveled rims cannot form an absolute or mathematical contact, the red-hot iron of the rod has a tendency to enter into the narrow spaces between the rims of the rolls at the four corners of the rectangular portions of the rolls. To prevent this there are arranged four adjustable guard-fingers, E, which are secured to the frame. These fingers are clearly shown in detail in Figs. 5 and 6, each being composed of a slotted end portion, a longer middle or shank portion, and a curved and tapering finger at the opposite end. The tapering fingers terminate in sharp points, which enter into the spaces between the beveled rims of the rolls, so as to form perfectly sharp and rigid corners or guides for the heated iron rod, which is drawn forward by the rolls. The fingers guide the rod and secure the formation of a smooth and sharp-edged nail-blank.

The guard-fingers form an essential feature of this invention, as without them the machine would not be able to turn out nail-blanks of the required degree of uniformity and finish. The guard-fingers are secured, as will be hereinafter fully explained, by their slotted ends to the angular frames B' in front of the machine, and a ring, E', placed in front of the slotted end portions, the ring being also secured to the angular frames. The guard-fingers are drawn or pressed against the rolls by set-screws $l$, which pass through the ring into the shanks of the guard-fingers. The ring is shown clearly in Fig. 6, but left out in Figs. 1, 2, and 3, so as to show the other parts of the machine with greater clearness. Each guard-finger E has at one end of its straight shank a right-angular portion, which is slotted to receive through it the screw for attaching the finger to the main cruciform frame near the angle formed by two rolls arranged in different planes. The end of the finger-shank opposite to said slotted portion is curved backward and outward, and its edges are beveled to a point, so that they lie close to the beveled edges of the rolls. These pointed portions of the fingers are adjusted close to the bite of the rolls, so that they will close the joints formed thereat and prevent the pressing out of pins at such joints. I use a finger, E, for each joint; hence four fingers are attached to the machine.

The adjustment of the fingers is preferably effected by means of the set-screws $l$, which are tapped through the fixed rings E' and bear against the fingers, or may be attached to them by swivels. The ring E is rigidly secured to posts projecting from the cruciform frame, but not shown in the drawings.

For the purpose of producing nail-blanks having different shapes of head, thickness, and length of shank, a number of interchangeable sets of rolls would be required. To obviate this each roll is made of three sections—an interior main section, $m$, having a circumferential flange, $m'$, at one side, an annular rim-section, $m^2$, and a ring-shaped face-plate, $m^3$. The rim-section is securely held in position on the main section by means of screw-bolts, which connect the face-plate and flange, the face-plate being also secured to the main section by screws. In this manner the rim-section is prevented from slipping on the main section.

By exchanging the rim-sections nail-blanks of different sizes and heads are produced. The diameter of the rolls has to be selected with relation to the different lengths of the nail-blanks, so that the different eccentric sections of each rim are of equal length, or but slightly differing in length from each other.

The use of different rim-sections for the rolls necessitates, also, the use of corresponding sets of guard-fingers, as each finger has to fit exactly into the space between the rolls. The bevel of the rolls is determined by the taper of the nail-shank between head and point. The central space in Figs. 7 and 8 corresponds to the cross-section of the nail-head.

It will be readily observed, by reference to Fig. 7, that nails with square heads require a different taper of shank than those with rectangular heads shown in Fig. 8.

The cutting-knives of one pair of rolls are dovetailed into the rim, as shown in Fig. 4, and secured at the sides by the flange and face-plate. If they are required to project to a greater extent beyond the circumference they are slightly filed off at their lower ends and edges, and raised by driving in a small wedge.

For the purpose of setting the beveled rim-sections of the rolls into their proper relative position to each other, one of the beveled wheels $e$ of the shaft C, as well as the upper transmitting gear-wheel, $f$, are axially adjustable on their shafts by means of a fixed separate hub, $n$, Fig. 12, along which the inner annular and slotted portion of the gear-wheels is adjusted and then secured by clamp-screws $n'$.

By loosening the screws the wheel may be shifted to one side or to the other on its fixed hub, as shown clearly in Fig. 12.

I am aware that nail-finishing machines are in use in which two pairs of rolls are employed to produce from forged, stamped, or cut nail-blanks without points finished horseshoe-nails beveled at the points, and I therefore do not lay claim, broadly, to the rolls.

It will be seen from that part of the above description relating to the rolls that I construct each roll with a removable die or forming rim or tire. I am aware that short segmental dies have been inserted into the circumference of rolls for forming nails, and such means I disclaim. By the use of circular interchangeable tires or rims, beveled as shown, I am able to produce nail-blanks from a rod successively without the loss of stock, and without intermissions of time during the revolutions of the rolls. The beveling of the peripheries of the rolls enables me to bring them in close bearing-contact at the point of the formation of the nail-blanks, and thus obtain a steady movement of the parts, and also prevent, with the aid of the guard-fingers, the pressing out of the hot metal during the swaging process. The die rings or tires require to be removed for nail-blanks of different kinds, and other rings or tires substituted. When this is done the rolls and the fingers must be adjusted to unite the tires on the rolls.

Having thus described my invention, I claim as new and desire to secure by Letters Patent—

1. In a machine for rolling nail-blanks from heated rods, the adjustable, pointed, and slotted fingers E, adapted to serve as guides and guards, in combination with the fixed ring and set-screws to adjust the fingers to the shaping-rolls, substantially as described.

2. In a machine for making nail-blanks, the slotted and pointed guard-fingers adjustably attached to the front post of the frame of the machine at the angles formed by the vertical and horizontal rolls, substantially as described.

3. A guard-finger and guide constructed with a curved and tapered portion, a slotted rear part, and a straight shank, substantially as described.

4. The combination, in a nail-blank machine, of the rolls arranged in pairs (the rolls of one pair being at right angles to those of the other pair) and provided with interchangeable annular rims having dies, the bearings of said rolls made adjustable horizontally to adapt the rolls to operate with rims of different sizes, and the pointed guard-fingers attached to the main frame, also adjustable to suit the rim used, substantially as described.

In testimony whereof I have signed my name to this specification in the presence of two subscribing witnesses.

HUGO MOELLER.

Witnesses:
CARL GEHLERT,
H. KREISMANN.